(12) United States Patent
Takahashi et al.

(10) Patent No.: US 7,681,223 B2
(45) Date of Patent: Mar. 16, 2010

(54) AUDIO/VIDEO REPRODUCING SYSTEM, AUDIO/VIDEO DEVICE THEREIN, AND AUDIO/VIDEO REPRODUCING METHOD THEREWITH

(75) Inventors: Hideki Takahashi, Iwaki (JP); Hisayuki Watanabe, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1084 days.

(21) Appl. No.: 10/914,984

(22) Filed: Aug. 10, 2004

(65) Prior Publication Data

US 2005/0053354 A1 Mar. 10, 2005

(30) Foreign Application Priority Data

Aug. 11, 2003 (JP) ............................. 2003-291133

(51) Int. Cl.
*H04N 7/173* (2006.01)
*G06F 15/16* (2006.01)

(52) U.S. Cl. ............................. 725/94; 725/86; 725/96; 725/101; 709/231

(58) Field of Classification Search .................. 725/55, 725/94, 96, 101; 434/319; 386/107; 17/55
See application file for complete search history.

(56) References Cited

U.S. PATENT DOCUMENTS

| | | | | |
|---|---|---|---|---|
| 4,888,698 A * | 12/1989 | Driessen et al. | ............. | 701/200 |
| 6,636,953 B2 * | 10/2003 | Yuasa et al. | ................. | 711/161 |
| 6,658,247 B1 * | 12/2003 | Saito | ........................ | 455/412.1 |
| 7,146,406 B2 * | 12/2006 | Ozawa | ........................ | 709/217 |
| 7,260,421 B2 * | 8/2007 | Harris | ........................ | 455/567 |
| 2004/0268400 A1 * | 12/2004 | Barde et al. | .................. | 725/94 |

FOREIGN PATENT DOCUMENTS

| | | |
|---|---|---|
| JP | 2002-278859 | 9/2002 |
| JP | 2003-009125 | 1/2003 |
| JP | 2003-123386 | 4/2003 |

OTHER PUBLICATIONS

Office Action dated Jul. 22, 2008 issued by the Japanese Patent Office in corresponding JP Application No. 2003-291133.

* cited by examiner

*Primary Examiner*—Dominic D Saltarelli
*Assistant Examiner*—Robert Hance
(74) *Attorney, Agent, or Firm*—Brinks Hofer Gilson & Lione (57) ABSTRACT

An audio/video reproducing system, an audio/video device therein, and an audio/video reproducing method therewith are provided that allow appreciation of a great deal of audio or video using a recording medium with a small capacity.

A server writes only a part of audio data read from an audio database in a recording medium. An audio reproducing device reads the audio data from the recording medium, while establishing communication connection with the server via the Internet to request lacking audio data. When an ID code and password sent from the audio reproducing device matches up with a pre-registered ID code and password, the server permits login and transmits the lacking audio data to the audio reproducing device. The audio reproducing device synthesizes the audio data read from the recording medium and the audio data sent from the server to produce complete audio data so as to reproduce audio.

20 Claims, 8 Drawing Sheets

AUDIO/VIDEO REPRODUCING SYSTEM, AUDIO/VIDEO DEVICE THEREIN, AND AUDIO/VIDEO REPRODUCING METHOD THEREWITH

BACKGROUND OF THE INVENTION

1. Field of the Invention

The present invention relates to an audio/video (AV) reproducing system using a recording medium with a relatively small capacity, such as a memory stick, a secure digital (SD) memory card, or the like, an AV device therein, and an AV reproducing method therewith. More particularly, the invention relates to an AV reproducing system for transferring a part of audio data or video data from a server, an AV device therein, and an AV reproducing method therewith.

2. Description of the Related Art

In recent years, audio reproducing devices have come into wide use that are operable to record audio data downloaded via the Internet or audio data ripped out of music CDs in a recording medium such as a memory stick, a SD memory card, or the like. This can encourage the appreciation of favorite music with ease, even outdoors. Also, video reproducing devices have been developed that are operable to record video data in the memory stick, the SD memory card, or the like, thereby allowing appreciation of the video data in the open air. Examples of such reproducing devices can be found in Japanese Patent Laid-Open No. 2003-123386 Publication.

The inventor, however, considers that the above-mentioned conventional AV devices have the following problems. That is, a recording medium with a small recording capacity is inexpensive, but has a little information recorded therein. For example, a recording medium with 32 MB to 64 MB recording capacity has recorded therein audio data concerning only six to twelve pieces of music, which data is compressed in MPEG Audio Layer-3 (MP3) format or the like.

In the foregoing Japanese Patent Laid-Open No. 2003-123386 Publication is disclosed an audio reproducing device which is designed to change the compression ratio of data (the way of compression) depending on the capacity of the recording medium so as to record therein all desired pieces of music. In order to fully appreciate audio or video, namely, music or images, sound quality or image quality should remain above a certain level. Excessive increase in the compression ratio is undesirable.

Making a copy of audio data or video data in digital form does not degrade the sound or image quality, which raises a problem in terms of copyright. Accordingly, an AV device that would not infringe the copyright is desired.

SUMMARY OF THE INVENTION

Therefore, the present invention is to solve the foregoing problems encountered with the known art, and it is an object of the present invention to provide an AV reproducing system that allows appreciation of a great deal of audio or video using a recording medium with a small capacity, an AV device incorporated in the system, and an AV reproducing method therewith.

It is another object of the present invention to provide an AV reproducing system that can prevent unauthorized use of audio data and video data, an AV device therein, and an AV reproducing method therewith.

An AV reproducing system according to one aspect of the invention comprises a server including a database that stores therein a plurality of pieces of audio or video data, and an AV reproducing device including a recording medium that stores therein only a part of the audio or video data, for reproducing audio or video by obtaining lacking data through communication connection with the server.

An AV device according to another aspect of the invention comprises a recording medium storing therein only a part of audio or video data, a data reader for reading the audio or video data from the recording medium, a difference data calculator for determining whether the audio or video data read from the recording medium is lacking or not and for outputting a signal for requesting lacking data when it is determined that the audio or video data is lacking, a communication controller for establishing communication connection with the server and for transmitting the signal for requesting the lacking data, which signal is outputted from the difference data calculator, to the server, a data buffer for temporarily saving the lacking data sent from the server, a data synthesizer for synthesizing the audio or video data read from the recording medium and the data saved in the data buffer to output complete audio or video data without missing any data, and a data processor for performing signal processing of the complete data outputted from the data synthesizer to output an audio or video signal.

An AV device according to still another aspect of the invention comprises a database storing therein a plurality of pieces of audio or video data, a division pattern managing section for managing a division pattern, a data writer into which a recording medium is detachably loaded, and a main controller for reading the audio or video data from the database, and for dividing the audio or video data in accordance with the division pattern to write only a part of the audio or video data in the recording medium via the data writer.

An AV device according to a further aspect of the invention comprises a database storing therein a plurality of pieces of audio or video data, a division pattern managing section for managing a division pattern, a communication controller for establishing communication connection with an external device, and a main controller that, upon receiving a signal for requesting lacking data from the external device via the communication controller, reads the audio or video data from the database, and divides the audio or video data in accordance with the division pattern to transmit only a part of the audio or video data to the external device via the communication controller.

An AV reproducing method for reproducing audio or video according to another aspect of the invention comprises the steps of storing a part of audio or video data in a recording medium, reading the audio or video data from the recording medium, while obtaining lacking audio or video data from a server through communication to produce complete audio or video data, and reproducing audio or video.

A recording medium according to another aspect of the invention, which stores therein a part of audio or video data, is loaded in an AV reproducing device including a communication device, for obtaining lacking data via the communication device.

In the AV reproducing system of the present invention, only a part of the audio or video data is recorded in the recording medium. Therefore, the only audio or video data recorded in this recording medium fails to reproduce the audio or video.

In order to fully reproduce the audio or video, lacking data needs to be obtained from the server. At this time, an identification (ID) code is required to log into the server. A user who has not been pre-stored yet in the server cannot be permitted to log into the server. This prevents unauthorized use of the audio data or video data.

The recording medium has recorded therein the only part of the audio or video data. This allows a great deal of audio or video data to be stored even in a recording medium with a small capacity.

The AV reproducing device for reproducing audio or video comprises, for example, a recording medium storing therein only a part of audio or video data, a data reader for reading the audio or video data from the recording medium, a difference data calculator for determining whether the audio or video data read from the recording medium is lacking or not and for outputting a signal for requesting lacking data when it is determined that the audio or video data is lacking, a communication controller for establishing communication connection with the server and for transmitting the signal for requesting the lacking data, which signal is outputted from the difference data calculator, to the server, a data buffer for temporarily saving the lacking data sent from the server, a data synthesizer for synthesizing the audio or video data read from the recording medium and the data saved in the data buffer to output complete audio or video data, and a data processor for performing signal processing of the complete data outputted from the data synthesizer to output an audio or video signal.

The AV device for recording audio or video data in the recording medium comprises, for example, a database storing therein a plurality of pieces of audio or video data, a division pattern managing section for managing a division pattern, a data writer into which a recording medium is detachably loaded, and a main controller for reading the audio or video data from the database, and for dividing the audio or video data in accordance with the division pattern to write only a part of the audio or video data in the recording medium via the data writer.

The AV device for transmitting lacking data to an AV reproducing device comprises, for example, a database storing therein a plurality of pieces of audio or video data, a division pattern managing section for managing a division pattern, a communication controller for establishing communication connection with an external device, and a main controller that, upon receiving a signal for requesting lacking data from the external device via the communication controller, reads the audio or video data from the database, and divides this audio or video data in accordance with the division pattern to transmit a part of the audio or video data to the external device via the communication controller.

DESCRIPTION OF THE PREFERRED EMBODIMENTS

Some preferred embodiments according to the present invention will be explained hereinafter with reference to the accompanying drawings.

First Preferred Embodiment

Figure 1:
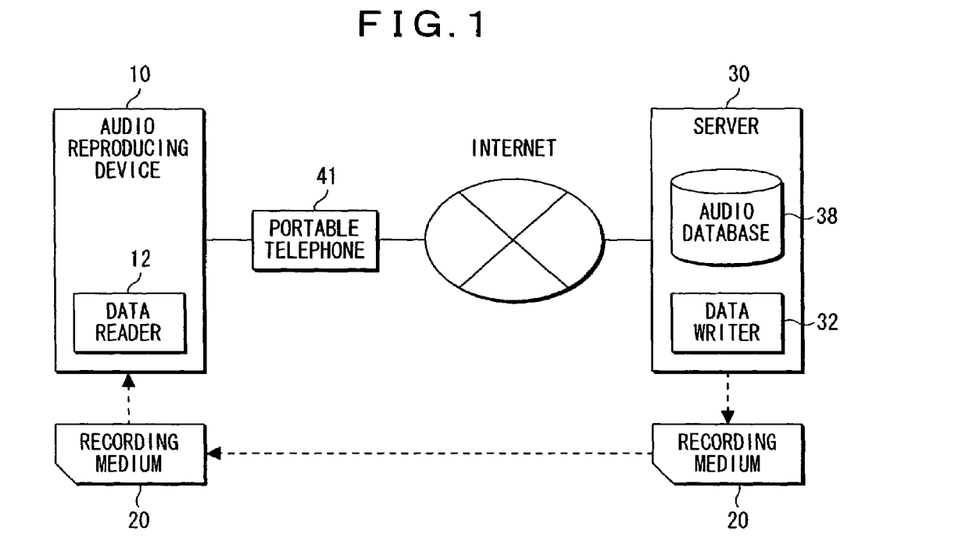
FIG. 1 is a schematic view of an AV reproducing system according to a first preferred embodiment of the present invention.

FIG. 1 illustrates a schematic view of an AV reproducing system according to a first preferred embodiment of the present invention. Now, a case where audio or music is set as an audio/video (AV) content, i.e., a case where the invention is applied to an audio reproducing system, will be described.

The audio reproducing system of the present preferred embodiment is composed of, for example, an audio reproducing device 10 mounted on a vehicle, and a server (home server) 30 including an audio database 38. The server 30 is connected to the Internet, to which the audio reproducing device 10 is connected via a portable telephone 41. The server 30 includes a data writer 32 for writing audio data in a recording medium 20, which is detachably loaded, such as a memory stick, a secure digital (SD) memory card, or the like. The audio reproducing device 10 includes a data reader 12 for reading the audio data from the recording medium 20.

The audio database 38 in the server 30 has recorded therein audio data on hundreds to thousands of pieces of music, which data is compressed in the MPEG Audio Layer-3 (MP3) compression format or the like, for example. A user writes audio data on a desired piece of music selected from these pieces in the recording medium 20, using the data writer 32 of the server 30. It should be noted that only a part of the audio data is recorded in the recording medium 20, and hence the only audio data written in the recording medium 20 fails to reproduce a desired piece of music. The audio data recorded in the recording medium 20 will be explained below.

When the recording medium 20 with the audio data recorded therein is loaded in the data reader 12 of the audio reproducing device 10 and a reproduction button is pressed, the audio reproducing device 10 starts to reproduce music, while gaining access to the server 30 through connection with the Internet via the portable telephone 41 to request transmission of lacking audio data. When the transmission of the lacking audio data is requested from the audio reproducing device 10, the server 30 reads out audio data from the audio database 38, and extracts the lacking audio data therefrom to transmit it to the audio reproducing device 10 via the Internet. Note that in order to obtain the lacking audio data from the server 30, an ID code and a password specific to the user (or the audio reproducing device 10) should be pre-registered in the server 30.

The audio reproducing device 10 combines or synthesizes the audio data recorded in the recording medium 20 and the lacking audio data sent from the server 30 to produce complete audio data, and then performs signal processing of the complete audio data to continue reproduction of audio or music.

Figure 2:
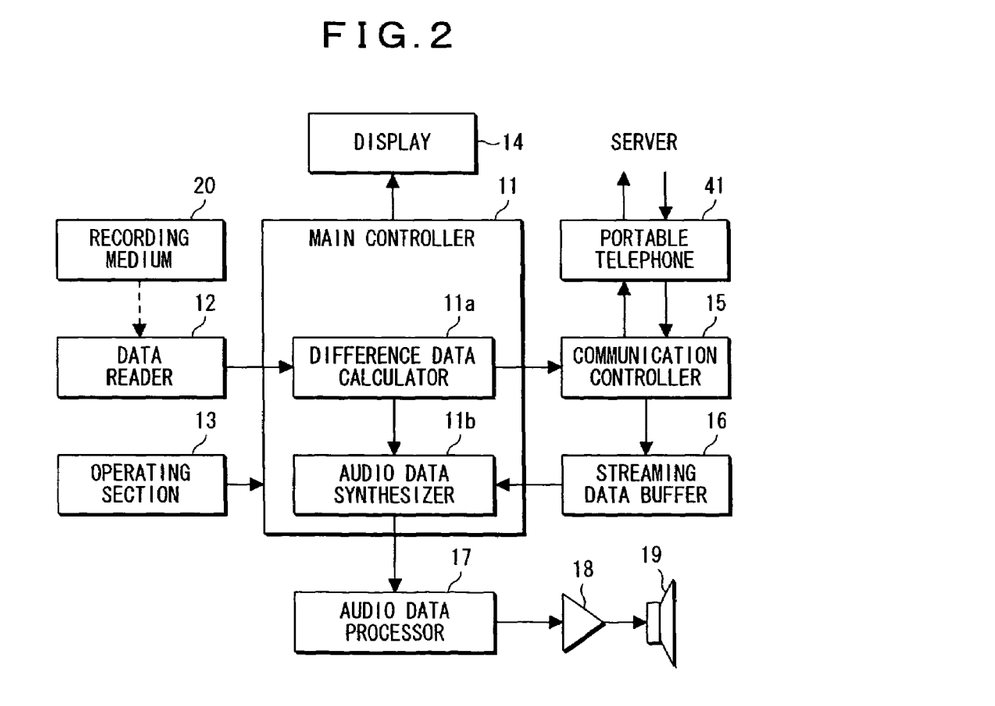
FIG. 2 is a block diagram showing the configuration of an audio reproducing device according to the first embodiment.

FIG. 2 shows a block diagram of the configuration of the audio reproducing device 10. The audio reproducing device 10 includes a main controller 11, a data reader 12, an operating section 13, a display 14, a communication controller 15, a streaming data buffer 16, an audio data processor 17, an amplifier 18, and a speaker 19. The main controller 11 includes a difference data calculator 11a and an audio data synthesizer 11b.

In the data reader 12 is loaded the data recording medium 20 that has recorded therein the audio data. This reader 12 reads the audio data from the recording medium 20 in response to a signal from the main controller 11. The operating section 13 has various buttons (key switches) or the like for operating the audio reproducing device 10. The display 14 is constructed by a liquid crystal panel or the like. On this display 14 is displayed information including a list of reproducible pieces of music, a name of one piece of music being reproduced, its artist name, its album name, its playing time, or so.

The difference data calculator 11a calculates an amount of the lacking data from the audio data which has been read from the recording medium 20 by the data reader 12. And the calculator transmits the audio data read from the recording medium 20 to the audio data synthesizer 11b, while outputting a lacking-data request signal, i.e., a signal for requesting the lacking audio data, to the communication controller 15.

The communication controller 15, when the lacking-data request signal is inputted therein from the main controller 11 (difference data calculator 11a), transmits this lacking-data request signal to the server 30 via the portable telephone 41. Further, when the lacking audio data is sent from the server 30 to the controller, this controller causes the lacking audio data to be temporarily saved in the streaming data buffer 16. Note that in the present embodiment, the ID code and password specific to the user (or the audio reproducing device 10) is stored in the communication controller 15, and in gaining access to the server 30, this ID code and password is used to log into the server 30.

The audio data synthesizer 11b, when the audio data sent from the difference data calculator 11a is lacking, reads the lacking audio data from the streaming data buffer 16, thereby synthesizing the audio data read from the recording medium and the data saved in the data buffer to produce complete audio data. The audio data processor 17 performs signal processing (decompression, digital/analog conversion, or the like) of the complete audio data outputted from the audio data synthesizer 11b to generate audio signals. The amplifier 18 amplifies the audio signals outputted from the audio data processor 17 and then supplies them to the speaker 19.

Figure 3:
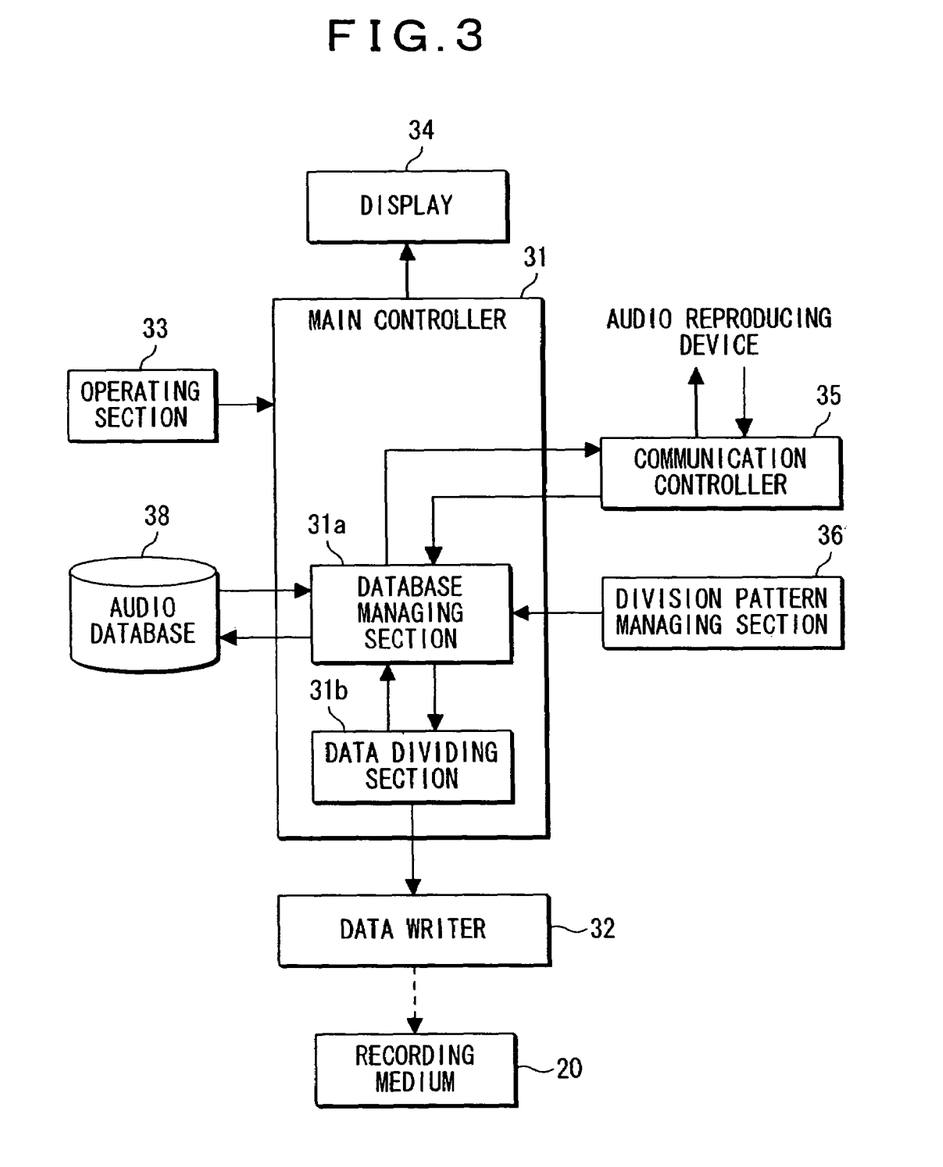
FIG. 3 is a block diagram showing the configuration of a server according to the first embodiment.

FIG. 3 shows a block diagram of the configuration of the server 30. The server 30 includes a main controller 31, a data writer 32, an operating section 33, a display 34, a communication controller 35, a division pattern managing section 36, and an audio database 38. The main controller 31 includes a database managing section 31a and a data dividing section 31b.

The data writer 32 writes or records the audio data in the recording medium 20 in response to a signal from the main controller 31. The operating section 33 has various buttons (key switches) or the like for operating the server 30. The display 34 is constructed by a liquid crystal panel or the like. On this display 34, various kinds of information are displayed by the main controller 31 depending on operating conditions.

The database managing section 31a controls the audio database 38 in response to a signal from the operating section 33 or a signal from the communication controller 35 so as to read out the audio data. The division pattern managing section 36 stores therein a division pattern which is made reference to when dividing the audio data. The data dividing section 31b, into which the audio data and the division pattern are inputted via the database managing section 31a, divides the audio data in accordance with the division pattern. The communication controller 35 performs control of signals which are transmitted and received via the Internet. Note that the communication controller 35 previously stores or registers the ID code and password of the user (or the audio reproducing device 10), which allows the user to log into the server 30. The communication controller 35 requests an external device (the audio reproducing device 10) which has required connection with the server via the Internet, to present its ID code and password. Only when the ID code and password sent from the external device matches up with the ID code and password previously registered, will the communication controller 35 permit the user to log into the server 30.

Now, the operation performed when recording the audio data in the recording medium 20 will be described.

First, the user loads the recording medium 20 in the data writer 32 of the server 30, and then gives an instruction to write desired audio data therein from the operating section 33. Thus, the main controller 31 reads the audio data from the audio database 38 via the database managing section 31a, while reading out the division pattern from the division pattern managing section 36. In accordance with this division pattern, the data dividing section 31b divides the audio data on one piece of music into blocks or units, causing the data writer 32 to record only a part of the audio data in the recording medium 20. An example of the division pattern is shown in the schematic view of FIG. 4.

Figure 4:
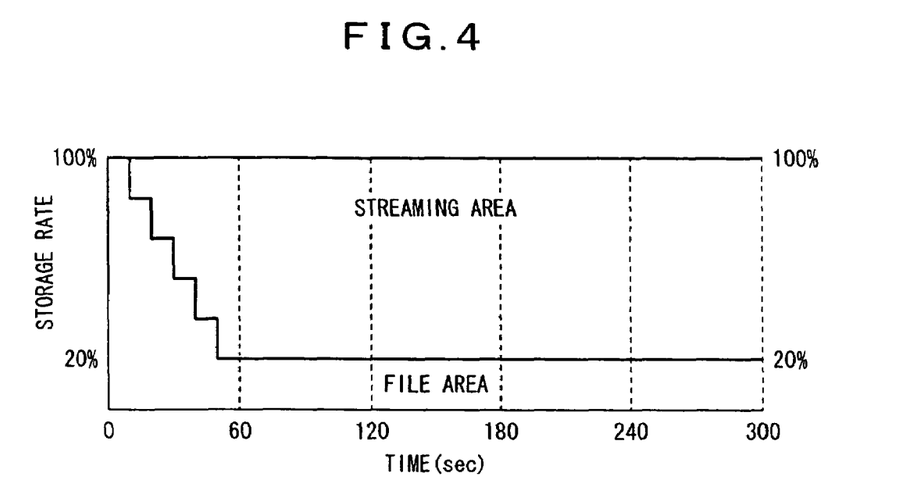
FIG. 4 is a schematic view showing an example of a division pattern employed in the first embodiment.

In the present embodiment, as shown in the example of the division pattern of FIG. 4, the audio data on one piece of music is divided into blocks (units), each corresponding to 10 seconds. In the first audio data of 60 seconds (namely, 6 units), the amount of data recorded in the recording medium 20 is ratcheted down by 16% from 100% every 10 seconds (for each unit). After 60 seconds, only 20% of the audio data is constantly recorded in the recording medium 20. The audio data recorded in the recording medium 20 is referred to as a file area, and the audio data in an area other than the foregoing area as a streaming area. To each unit of the audio data which is recorded in the recording medium 20, addition data, that is, data concerning the amount of an entire unit of audio data (i.e., data about the total amount of data in the streaming and file areas) is added or appended.

Assuming that audio data on one piece of music having the total playing time of 5 minutes and the amount of data of 5 MB is recorded in the recording medium 20, the amount of the audio data in the first 60 seconds is 0.6 MB, which is derived by the following formula: 1(MB)−(1+2+3+4+5)× 0.16×1(MB)/6=0.6 MB. And, after 60 seconds, only 20% of the audio data (i.e., 0.2 MB per minute) is recorded in the recording medium. Accordingly, regardless of the addition data, the total amount of data about one piece of music which data is recorded in the recording medium is 1.4 MB (=0.6 (MB)+0.2 (MB)×4). Thus, the recording medium having a recording capacity of 32 MB can record audio data concerning 22 pieces of music, while the recording medium having 64 MB capacity can record audio data about 45 pieces. According to the system of the invention, the number of pieces of music recordable in one recording medium can be increased about 3.6 times or more, compared with the prior art.

Figure 5:
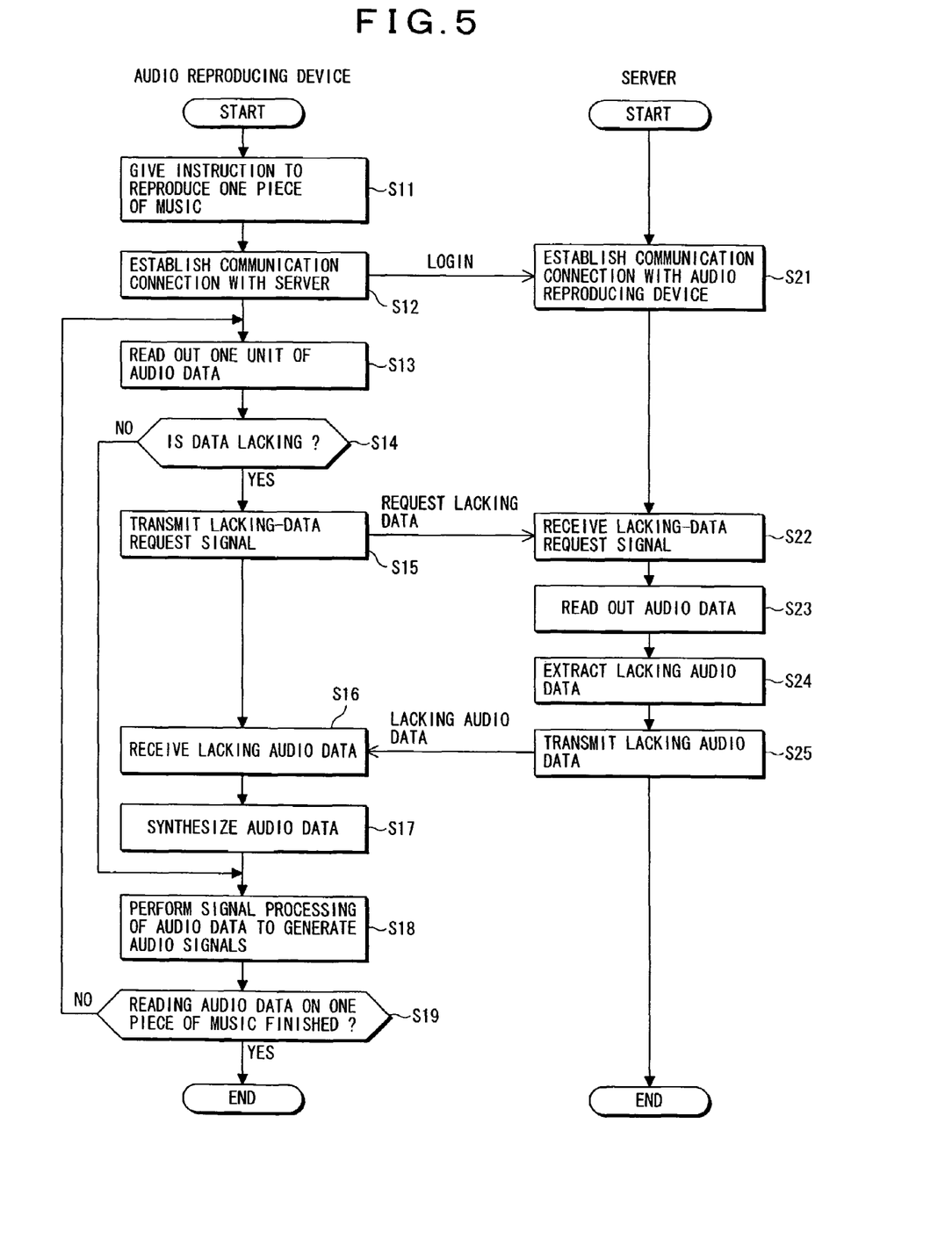
FIG. 5 is a flowchart showing an operation performed when reproducing audio according to the first embodiment.

Now, the operation performed when reproducing audio or music recorded in the recording medium 20 will be described with reference to a flowchart of FIG. 5.

First, at step S11, the recording medium 20 which records therein the audio data is loaded in the data reader 12 of the audio reproducing device 10, and a predetermined operation is performed, so that the main controller 11 controls the data reader 12 to cause the reader to read the names of recorded pieces of music or songs from the recording medium 20, thereby displaying a list of the recorded songs on the display 14. Thereafter, when a user designates a desired song from the song list using the operating section 13, the operation proceeds to step S12.

At step S12, the main controller 11 gives the communication controller 15 a command to establish communication connection with the server 30. Thus, the communication controller 15 starts to establish communication connection with the server 30. When the server 30 is connected with the audio reproducing device 10 through communication at step S21, it requests an ID code and password. Then, the communication controller 15 transmits an ID code and password pre-stored to the server 30. When the ID code and password transmitted from the audio reproducing device 10 matches up with the ID code and password pre-registered in the server, the server 30 permits login.

It should be noted that if the ID code and password transmitted from the audio reproducing device 10 is not pre-registered in the server 30, the server never permits login. Then, in this case, the audio reproducing device 10 cannot obtain the audio data from the server 30, and fails to reproduce the audio. In the present embodiment, if the ID code and password transmitted from the audio reproducing device 10 has been pre-registered in the communication controller 35 of the server 30, then login is permitted by the server 30.

As soon as the main controller 11 of the reproducing device 10 gives the communication controller 15 an instruction to establish communication connection with the server 30 at step S12, the main controller 11 proceeds to step S13 to read audio data concerning the designated song from the recording medium 20.

When the first unit (10 second block) of audio data is read from the recording medium 20, the operation proceeds to step S14, wherein the main controller 11 determines whether the data is lacking or not for reproducing the entire song. That is, the difference data calculator 11a calculates a shortfall (difference) in the data based on the addition data added to the audio data and the amount of the one unit of audio data actually read from the recording medium 20. Since the first unit of audio data is not lacking at all, the operation goes directly from step S14 to step S18.

At step S18, the first one unit of audio data is outputted from the main controller 11 to the audio data processor 17. This audio data is subjected to signal processing by the audio data processor 17 to generate audio signals. The amplifier 18 amplifies the audio signals outputted from the audio data processor 17, and then supplies the amplified signals to the speaker 19. Thus, the first 10 seconds of audio starts to be reproduced.

On the other hand, as soon as the main controller 11 outputs the first one unit of audio data to the audio data processor 17, the operation proceeds to step S19, wherein it is determined whether reading the entire audio data on one piece of music is finished or not. Since, at this time, only the first unit of data is read out, the operation returns from step S19 to step S13.

At step S13, a next unit of audio data is read from the recording medium 20. At step S14, by comparing addition data which is added to the audio data read from the recording medium 20 (that is, data concerning the total amount of the entire unit of audio data) with the amount of one unit of the audio data actually read from the recording medium 20, it is determined whether the audio data is lacking or not. In this embodiment, the second or later unit is lacking in audio data, which inevitably causes the operation to proceed to step S15.

At step S15, a lacking-data request signal, i.e., a signal for requesting the lacking audio data, is outputted by the main controller 11. This lacking-data request signal is transmitted to the server 30 via the communication controller 15. The lacking-data request signal includes data indicating which piece of music is requested, and data indicating which part of the piece (what number of unit) is requested.

When the server 30 receives the lacking-data request signal at step S22, it proceeds to step S23. At step S23, corresponding audio data is read from the audio database 38. Thereafter, the operation proceeds to step S24, wherein the audio data is divided into units based on the division pattern set by the division pattern managing section 36, and lacking audio data of the requested unit (that is, the audio data in the streaming area) is extracted. Then, the operation proceeds to step S25, wherein the lacking audio data is transmitted to the audio reproducing device 10.

When the audio reproducing device 10 receives the lacking audio data from the server 30 at step S16, it temporarily saves the lacking audio data in the streaming data buffer 16. Thereafter the operation proceeds to step S17, wherein the audio data read from the recording medium 20 and the lacking audio data saved in the streaming data buffer 16 are synthesized by the audio data synthesizer 11b, so that complete audio data is sent to the audio data processor 17.

The audio data processor 17, after finishing signal processing of one unit of audio data at step S18, subsequently receives a next unit of audio data sent from the audio data synthesizer 11b, and performs signal processing of the received audio data to produce audio signals. The audio signals sent from the audio data processor 17 are amplified by the amplifier 18 to be supplied to the speaker 19.

On the other hand, as soon as the main controller 31 sends the one unit of audio data to the audio data processor 17, the operation proceeds to step S19, wherein it is determined whether reading of the entire audio data on one piece of music has been finished or not. If not, the operation returns to step S13, and repeats the foregoing steps. When reading of the entire data on one piece has been finished, this process is completed.

In the present embodiment, only a part of audio data is written or recorded in the recording medium 20. Thus, even the recording medium with small capacity can record a great number of pieces of music. In this case, since the first 10 seconds of audio data is not lacking at all, as soon as an instruction to reproduce music is given by the user, audio or music corresponding to the data starts to be reproduced. Until 10 seconds have elapsed, communication with the server 30 is established to obtain the lacking audio data to be used in the next 10 second period, from the server 30. Thereafter, at step S19, it is determined whether reading of the entire audio data on one piece of music has been finished or not. If not, the operation returns to step S13. When it is determined that reading of the entire audio data on one piece of music has been finished, the reading of the audio data is completed. Thus, the audio reproducing device 10 of the present embodiment enables audio reproduction without a pause.

Even if the audio data recorded in the recording medium 20 is copied from the recording medium 20 to another recording medium, when the ID code and password is not pre-registered in the server 30, users will not be able to log into the server 30, so that unauthorized use of the audio data is prevented.

It should be noted that although in the above-mentioned embodiment, only one piece of music is reproduced, the invention is not limited thereto. A plurality of pieces of music may be continuously reproduced. And in this case, the foregoing processes are carried out in sequence. Note that when reproducing the second or later piece of music, transmission of the ID code and password may be omitted.

Although, in the present embodiment, the division pattern such as that shown in FIG. 4 is employed, the division pattern may be preferably set according to a time and a communication speed required for user authentication through ID codes and passwords, or the like. Therefore, the division pattern is not limited to that shown in FIG. 4. In order to start reproduction as soon as the reproduction button is pressed, the entire audio data on at least the first 10 second piece of music is preferably recorded in the recording medium 20 without lacking any data.

Further, in the present embodiment, the server 30 extracts the audio data in the streaming area to transmit only this lacking audio data to the audio reproducing device 10. Note that each divided unit of the audio data may be transmitted to the audio reproducing device 10 as it is, and then lacking data may be extracted within the audio reproducing device 10.

Second Preferred Embodiment

Figure 6:
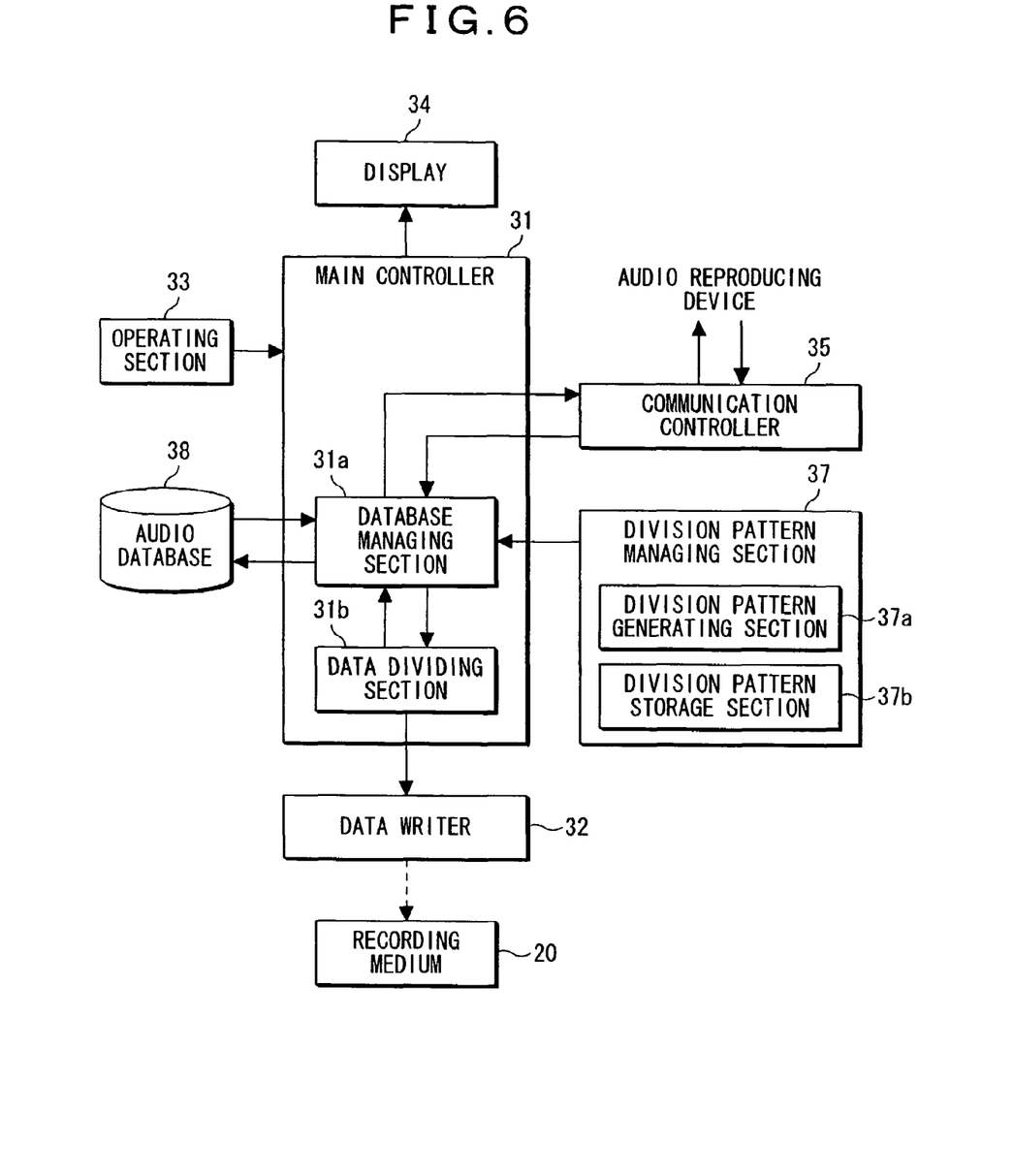
FIG. 6 is a block diagram showing the configuration of a server according to a second preferred embodiment of the present invention.

FIG. 6 shows a block diagram of the configuration of a server in an AV reproducing system (audio reproducing system) according to the second preferred embodiment of the present invention. Referring to FIG. 6, elements that are in common to FIG. 3 are given the same reference characters, and explanation thereof will be omitted. In this embodiment, basic configurations of the system and the audio reproducing device are the same as those in the first embodiment. Now, the second embodiment will be explained with reference to the block diagram of the system configuration such as that shown in FIG. 1 and the block diagram of the configuration of the audio reproducing device such as that shown in FIG. 2.

In the present embodiment, a division pattern managing section 37 is composed of a division pattern generating section 37a and a division pattern storage section 37b. The division pattern generating section 37a generates a division pattern which determines a rate of a file area to a streaming area every unit when the audio data is recorded in the recording medium 20. The division pattern storage section 37b stores therein the division pattern generated by the division pattern generating section 37a, by linking a piece of music to which the pattern is applied, to the division pattern.

Figure 7:
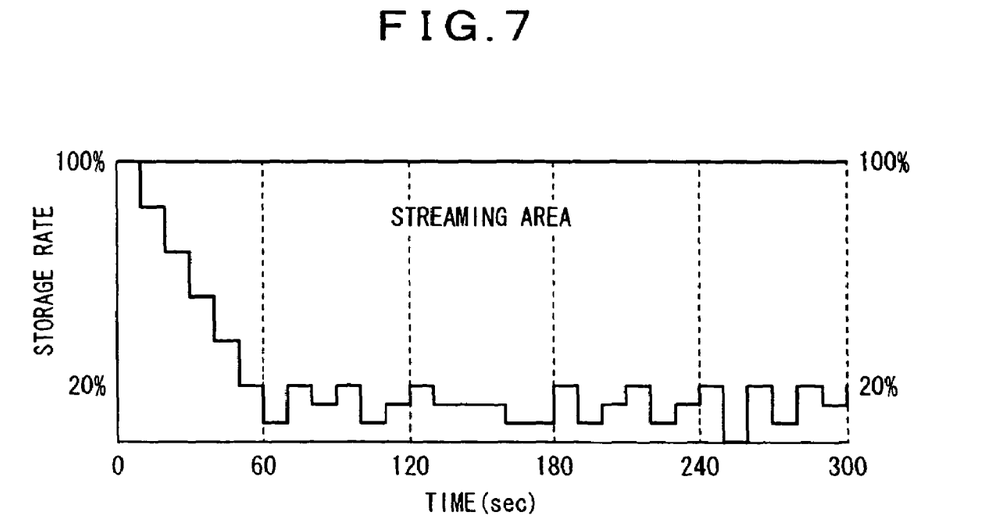
FIG. 7 is a schematic view showing an example of a division pattern employed in the second embodiment.

FIG. 7 illustrates a schematic view of another example of the division pattern generated by the division pattern generating section 37a. With reference to this figure, an operation performed when recording audio data in the recording medium 20 will be described hereinafter.

Also, in the present embodiment, audio data on one piece of music is divided into 10 second units, in the same way as the first embodiment. In the first audio data of 60 seconds (namely, 6 units), the rate of a file area recorded in the recording medium 20 is ratcheted down by 16% from 100% every 10 seconds (for each unit).

After 60 seconds, the audio data is recorded in the recording medium 20 such that the rate of the file area recorded in the recording medium is set between 0% and 20% in a random fashion. In the embodiment, the rate of the streaming area to the file area is determined in accordance with a division pattern such as that shown in FIG. 7. The data dividing section 31b of the server 30 divides the audio data into the file and streaming areas for each unit based on the division pattern to record the only audio data of the file area in the recording medium 20 via the data writer 32.

Figure 8:
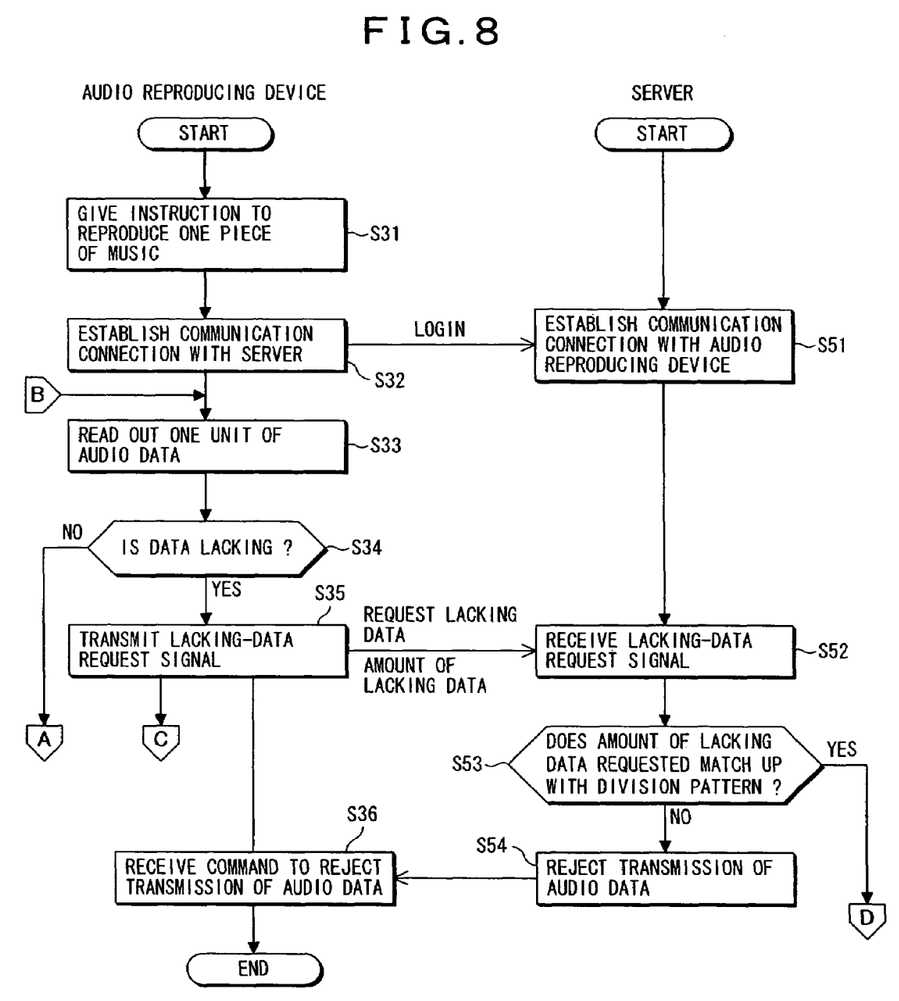
FIG. 8 is a flowchart (No. 1) showing an operation performed when reproducing audio according to the second embodiment.
Figure 9:
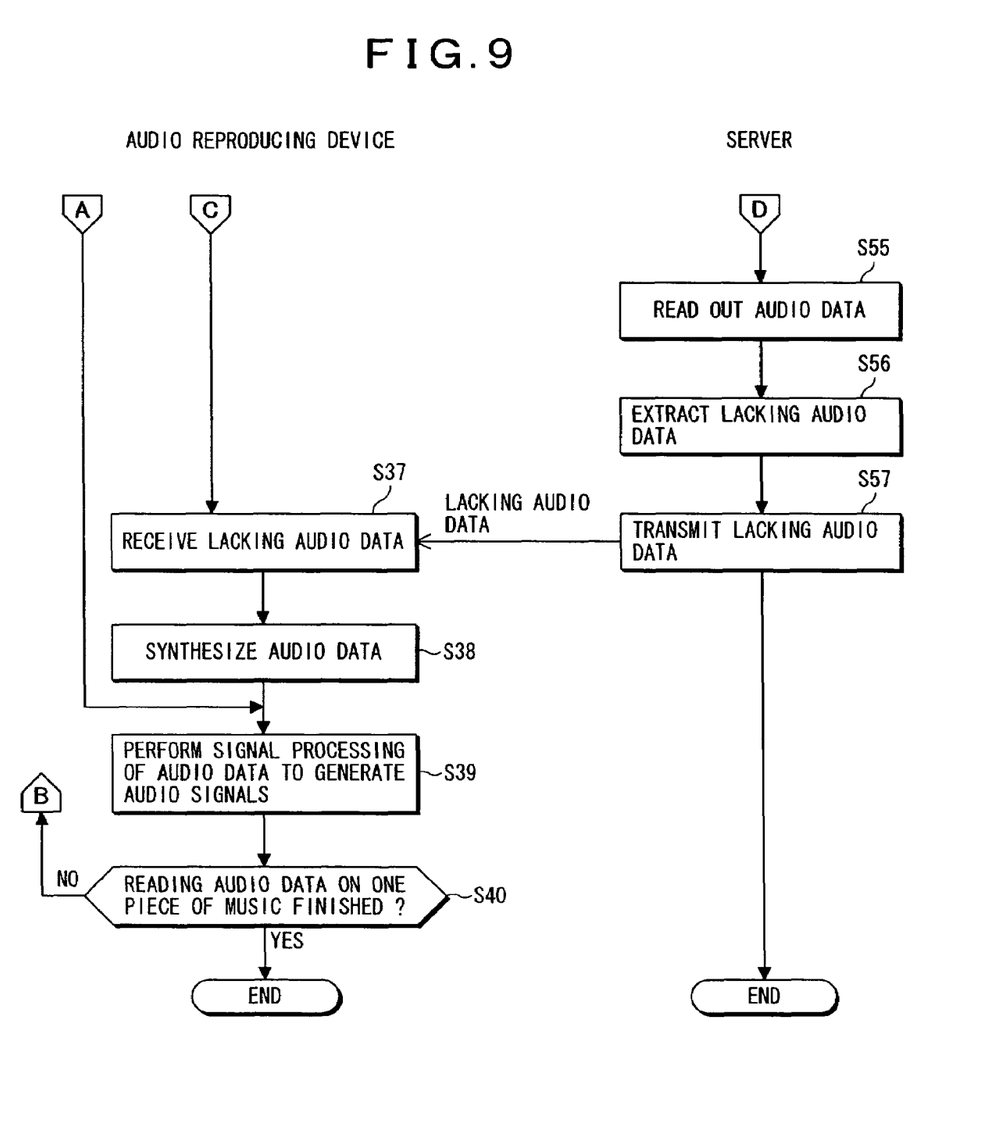
FIG. 9 is a flowchart (No. 2) showing an operation performed when reproducing audio according to the second embodiment.

Now, an operation performed when reproducing audio or music recorded in the recording medium 20 will be described with reference to the flowcharts of FIGS. 8 and 9.

First, at step S31, the recording medium 20 which records therein the audio data is loaded in the data reader 12 of the audio reproducing device 10, and a predetermined operation is performed, so that the main controller 11 controls the data reader 12 to cause the reader to read the names of recorded pieces of music or songs from the recording medium 20, thereby displaying a list of the recorded songs on the display 14. Thereafter, when a user designates a desired song from the song list using the operating section 13, the operation proceeds to step S32.

At step S32, the main controller 11 gives the communication controller 15 a command to establish communication connection with the server 30. Thus, the main controller 15 starts the communication connection with the server 30. When the server 30 establishes communication connection with the audio reproducing device 10 at step S51, it requests an ID code and password. Then, the communication controller 15 transmits an ID code and password pre-stored to the server. When the ID code and password transmitted from the audio reproducing device 10 matches up with the ID code and password pre-registered in the server, the communication controller 35 of the server 30 permits login.

As soon as the main controller 11 of the reproducing device 10 gives the communication controller 15 an instruction to establish communication connection with the server 30 at step S32, the controller 11 proceeds to step S33 to read audio data concerning the designated song or piece of music from the recording medium 20.

When the first unit (10 second block) of audio data is read from the recording medium 20, the operation proceeds to step S34, wherein the main controller 11 determines whether the data is lacking or not for reproducing the entire song. Since the first unit of audio data is not lacking at all, the operation goes directly from step S34 to step S39.

At step S39, the audio data is subjected to signal processing by the audio data processor 17 to generate audio signals. On the other hand, as soon as the main controller 11 sends the first unit of audio data to the audio data processor 17, the controller proceeds to step S40 to determine whether reading the entire audio data on one piece of music has been finished or not. Since, at this time, only the first unit of data is read, the operation returns from step S40 to step S33.

At step S33, a next unit of audio data is read from the recording medium 20. At step S34, by comparing addition data which is added to the audio data read from the recording medium 20 (that is, data concerning the total amount of the entire unit of audio data) with the amount of the audio data actually read from the recording medium 20, it is determined whether the audio data is lacking or not. In this embodiment, the second or later unit is lacking in audio data, which inevitably causes the operation to proceed to step S35.

At step S35, a lacking-data request signal and a signal indicating the amount of lacking data are sent by the main controller 11. These signals are transmitted to the server 30 via the communication controller 15. The lacking-data request signal includes data indicating what song to be played, and data indicating which part of the song (what number of unit) is requested. The amount of lacking data is a value obtained by subtracting the amount of audio data stored in the recording medium 20 (the data amount of the file area) from the amount of the entire unit data (the total amount of the data both in the file area and the streaming area), which is recognized by the addition data.

When the server 30 receives the lacking-data request signal at step S52, the operation proceeds to step S53. At this step, referring to the division pattern of the song or piece stored in the division pattern storage section 37b, it is determined whether the amount of the lacking data requested matches up with the amount of the streaming area data set by the division pattern. If not, it is found that the audio data recorded in the recording medium 20 is not data written by the server 30. Then the operation proceeds to step S54, wherein an audio-data-transmission rejection signal is transmitted to the audio reproducing device 10. When the audio reproducing device 10 receives the audio-data-transmission rejection signal from the server 30 at step S36, the reproduction process of audio is discontinued.

On the other hand, if it is determined that the amount of the lacking data requested matches up with the amount of the streaming area data set by the division pattern, the operation proceeds to step S55. The corresponding audio data is read from the audio database 38. Then, the operation proceeds to step S56, wherein the audio data is divided based on the division pattern of the corresponding piece or song to extract the lacking audio data of the requested unit. Thereafter, the operation proceeds to step S57 to transmit the lacking audio data to the audio reproducing device 10.

When the audio reproducing device 10 receives the lacking audio data from the server 30 at step S37, it temporarily saves the lacking audio data in the streaming data buffer 16. Thereafter the operation proceeds to step S38, wherein the audio data read from the recording medium 20 and the lacking audio data saved in the streaming data buffer 16 are synthesized by the audio data synthesizer 11b, so that complete synthesized audio data is sent to the audio data processor 17.

The audio data processor 17, after finishing signal processing of one unit of the audio data at step S39, subsequently receives a next unit of audio data sent from the audio data synthesizer 11b, and performs signal processing of the received audio data to produce audio signals. The audio signals outputted from the audio data processor 17 are amplified by the amplifier 18 to be supplied to the speaker 19.

On the other hand, as soon as the main controller 31 sends the one unit of audio data to the audio data processor 17, the operation proceeds to step S40, wherein it is determined whether reading of the entire audio data on one piece of music has been finished or not. If not, the operation returns to step S33, and repeats the foregoing steps. When reading of the entire data on one piece has been finished, this process is completed.

In the present preferred embodiment, the audio data about more pieces of music than in the first embodiment can be recorded. In the present embodiment, the amount of lacking data requested from the audio reproducing device 10 for every unit, and the amount of data in the streaming area calculated from the division pattern, which is stored in the division pattern storage section 37b, are compared to each other so as to determine whether the audio data stored in the recording medium 20 has been written by the server 30. This provides an advantage in that unauthorized use of the audio data is prevented more reliably than in the first preferred embodiment.

For example, the audio data of 5 MB concerning one piece of music having a playing time of 5 minutes is written in the recording medium 20. The amount of the first 60 seconds of audio data written in the recording medium 20 is 0.6 MB as explained in the above first preferred embodiment. After 60 seconds, the audio data is recorded in the recording medium 20 such that the amount of the data to be recorded is determined within a range of 0% to 20% for each unit (10 seconds). As a result, the amount of the audio data recorded in the recording medium after 60 seconds is a minimum of 0 byte, and a maximum of 33333 byte. That is, the total amount of the data concerning one piece of music recorded in the recording medium 20 is a minimum of 0.6 MB, and a maximum of 1.4 MB. The recording medium with a capacity of 32 MB can record therein audio data concerning 22 to 53 pieces of music. Moreover, the recording medium with a capacity of 64 MB can record therein audio data concerning 45 to 106 pieces of music.

The amount of one unit of the data after 60 seconds can have any of 33333 possible values, i.e, 0 byte through 33333 bytes (=5 (MB)×(10 (sec)/300 (sec))×0.2). Since the number of units between 60 and 300 seconds is 24, the division pattern can have any of values of the 24th power of 33333. Accordingly, even if the audio data written in the recording medium 20 is copied from the medium 20 to another recording medium, when a user cannot log into the server 30 storing the division pattern when recording the audio data in the recording medium 20, reproduction of music or audio is not allowed, thereby robustly protecting copyright.

In the foregoing embodiment, the audio reproducing device 10 gains access to the server 30 using the portable telephone 42, but a method of establishing connection between the audio reproducing device 10 and the server 30 is not limited to this method. For instance, the audio reproducing device 10 and the server 30 may be connected to each other via communication including a wireless LAN, a wired LAN, a dedicated line, or the like.

In the foregoing embodiment, the case where the audio data is recorded in the recording medium 20 such as the memory stick or the SD memory card detachably loaded has been explained. The audio data may be recorded in a memory embedded in the audio reproducing device.

Further, although in the above-mentioned embodiment the AV content is audio or music, the invention may be applied to a case where the AV content is video or images. In this case, the video data to be used is data compressed in MPEG 4 format or the like, for example.

Other Embodiments

The invention may be applied to sales or rental service of audio or video contents. For example, only a part of audio (or video) data is recorded in a recording medium such as the memory stick or the SD memory card as explained in the first and second embodiments, to be passed a customer. Also, at this time, an address of the server, an ID code, and a password are simultaneously recorded in the recording medium.

The customer loads the recording medium into his/her own audio (or video) reproducing device to perform a predetermined operation. Thus, the audio (or video) reproducing device reads the first unit of audio (or video) data from the recording medium to start to reproduce audio (or video), while reading out the address of the server, the ID code, and the password from the recording medium so as to connect to the server. Then, lacking audio (or video) data is obtained from the server. Thereafter, the audio (or video) data read from the recording medium and the lacking audio (or video) data obtained from the server are synthesized into complete audio (or video) data without missing data, so that reproduction of audio (or video) is continued.

In the case of renting audio or video contents, if an expiry date of rental has passed, the ID code and password is set invalid in the server. Thus, reproduction of the audio or video is not available after the expiry date of rental.

When the invention is applied to rental of audio or video contents, after the expiry date of rental, the contents are not able to be used. Thus, the invention has an advantage in that a late charge is not required after the expiry date, as distinct from existing rental service of CDs or the like. Also, this facilitates management of the contents at rental shops, and the possibility of the customer damaging or losing the CD is eliminated. Further, in the case of CD rental, the customer would illegally copy a rented CD, but the rental service of the audio or video contents to which the invention is applied prevents illegal copying of the contents.

What is claimed is:

1. An audio/video reproducing system, comprising:
a server including a database that stores a plurality of complete pieces of audio or video data, the server being configured to store partial pieces of audio or video data onto a detachable recording medium, wherein a size of each partial piece of data stored on the detachable recording medium is determined based on a first division pattern and a second division pattern, the first and second division patterns determined in accordance with a communication speed between the server and the detachable recording medium, and in accordance with a time required to authenticate identification codes to effect the storing of the data;
the first division pattern corresponding to an initial predetermined period of time corresponding to the data to be stored, and having a plurality of sequential time slices, wherein an amount of data stored from a first time slice to a last time slice decreases in a step-like manner;
the second division pattern corresponding to data to be stored after the initial predetermined period of time, and having a plurality of sequential time slices, wherein an amount of data to be stored is stored at a constant rate; and
an audio/video reproducing device configured to (1) subsequently read a partial piece of audio or video data stored on the detachable recording medium and (2) determine whether the partial piece of audio or video data read from the detachable recording medium is complete, wherein when the audio/video reproducing device determines that the partial piece of audio or video data is not complete, the audio/video reproducing device obtains lacking data from the database through communication connection with the server, the lacking data being the rest of the audio or video data, and combines the partial piece of audio or video data read from the detachable recording medium with the lacking data retrieved from the database to reproduce a corresponding complete piece of audio or video.

2. The audio/video reproducing system according to claim 1, wherein when an initial partial piece of the audio or video data stored in the detachable recording medium is started to be reproduced by the audio/video reproducing device, the audio/video reproducing device is configured to automatically gain access to the server such that the lacking data may be retrieved from the database.

3. The audio/video reproducing system according to claim 1, wherein the detachable recording medium stores a first block of the partial piece of audio or video data without missing any audio or video data.

4. The audio/video reproducing system according to claim 1, wherein the audio/video reproducing device logs into the server, using an ID code pre-registered in the server.

5. The audio/video reproducing system according to claim 1, wherein the audio/video reproducing device informs the server of an amount of lacking data desired, and the server determines whether the lacking data is transmitted or not, based on the amount of the lacking data which has been requested by the audio/video reproducing device.

6. An audio/video device comprising:
a detachable recording medium storing a piece of audio or video data;
a data reader for reading the piece of audio or video data from the detachable recording medium;
a difference data calculator for determining whether the piece of audio or video data read from the detachable recording medium is incomplete and for sending a signal for requesting lacking data when it is determined that the piece of audio or video data is incomplete;
a communication controller for establishing communication connection with a server and for transmitting the signal for requesting the lacking data, the request signal is relayed from the difference data calculator to the server;
a data buffer for temporarily saving the lacking data sent from the server, the lacking data being extracted from a first complete piece of audio or video data stored in a remote database such that a corresponding second complete piece of audio or video data may be reconstructed by combing the lacking data sent from the server with the piece of audio or video data read from the detachable recording medium;
said lacking data transmitted from the server as a plurality of partial pieces of audio or video data, wherein a size of each partial piece of data is determined based on a first division pattern and a second division pattern, the first and second division patterns determined in accordance with a communication speed between the server and the detachable recording medium, and in accordance with a time required to authenticate identification codes to effect the storing of the data;
the first division pattern corresponding to an initial predetermined period of time corresponding to the data to be stored, and having a plurality of sequential time slices, wherein an amount of data stored from a first time slice to a last time slice decreases in a step-like manner;
the second division pattern corresponding to data to be stored after the initial predetermined period of time, and having a plurality of sequential time slices, wherein an amount of data to be stored is stored at a constant rate;
a data combiner configured to combine the piece of audio or video data read from the detachable recording medium and the lacking data saved in the data buffer to produce the second complete piece of audio or video data; and
a data processor for performing signal processing of the second complete piece of audio or video data produced from the data combiner to generate an audio or video signal.

7. The audio/video device according to claim 6, wherein the data reader, when the detachable recording medium is loaded, reads list data from the detachable recording medium for displaying a list on a display section.

8. The audio/video device according to claim 6, wherein, upon determining whether the audio or video data read from the detachable recording medium is incomplete, the difference data calculator compares the total amount of the entire audio or video data, addition data concerning the total amount being recorded in the detachable recording medium, and an amount of the data read from the detachable recording medium, thereby determining whether the read data is incomplete.

9. An audio/video device comprising:
a database storing complete pieces of audio or video data;
a division pattern managing section for managing a first division pattern and a second division pattern;
a data writer into which a detachable recording medium is detachably loaded; and a main controller for reading the complete pieces of audio or video data from the database, and for dividing the complete pieces of audio or video data in accordance with the division patterns into partial pieces of audio or video data and pre-loading only one or more of the partial pieces of audio or video data for each corresponding complete piece of audio or video data in the detachable recording medium via the data writer such that the complete piece of audio or video data can be subsequently reproduced in its entirety using the one or more partial pieces of audio or video data stored on the detachable recording medium;

wherein a size of each partial piece of data is determined based on the first division pattern and the second division pattern, the first and second division patterns determined in accordance with a communication speed between the data writer and the detachable recording medium, and in accordance with a time required to authenticate identification codes to effect the storing of the data;

the first division pattern corresponding to an initial predetermined period of time corresponding to the data to be stored, and having a plurality of sequential time slices, wherein an amount of data stored from a first time slice to a last time slice decreases in a step-like manner; and the second division pattern corresponding to data to be stored after the initial predetermined period of time, and having a plurality of sequential time slices, wherein an amount of data to be stored is stored at a constant rate.

10. The audio/video device according to claim 9, wherein the division pattern managing section stores one division pattern.

11. The audio/video device according to claim 9, wherein the division pattern managing section comprises:
a generating section for generating different division patterns depending on audio or video; and
a storage section for storing the corresponding division pattern for each audio or video.

12. The audio/video device according to claim 9, wherein the main controller, when the audio or video data is divided into a file area and a streaming area in accordance with the division pattern, stores only data of the file area in the detachable recording medium.

13. The audio/video device according to claim 12, wherein the generating section generates the division pattern for determining the file area and the streaming area when the audio or video data is written in the detachable recording medium.

14. An audio/video device comprising:
a database storing a plurality of complete pieces of audio or video data;
a division pattern managing section for managing a first division pattern and a second;
a communication controller for establishing communication connection with an external device, the external device configured to determine lacking data associated with a partial piece of audio or video data, the lacking data combined with the partial piece of audio or video data forming a complete piece of audio or video data; and
a main controller that, upon receiving a signal requesting the lacking data from the external device via the communication controller, reads a corresponding complete piece of audio or video data from the database, and divides the complete piece of audio or video data into a plurality of partial pieces in accordance with the division patterns to transmit the partial pieces of audio or video data as lacking data to the external device via the communication controller, wherein a size of each partial piece of data determined based on the first division pattern and the second division pattern, the first and second division patterns determined in accordance with a communication speed between the external device and the communication controller, and in accordance with a time required to authenticate identification codes to effect the storing of the data;

the first division pattern corresponding to an initial predetermined period of time corresponding to the data to be stored, and having a plurality of sequential time slices, wherein an amount of data stored from a first time slice to a last time slice decreases in a step-like manner; and the second division pattern corresponding to data to be stored after the initial predetermined period of time, and having a plurality of sequential time slices, wherein an amount of data to be stored is stored at a constant rate.

15. The audio/video device according to claim 14, wherein the main controller transmits the part of the complete piece of audio or video data to the external device when an amount of lacking data sent from the external device via the communication controller matches up with an amount of lacking data which is calculated based on the division pattern stored in the division pattern managing section.

16. An audio/video reproducing method for reproducing audio or video, comprising:
storing a partial piece of audio or video data in a detachable recording medium, wherein a size of each partial piece of audio or video data stored on the detachable recording medium is determined based on a first and second division pattern, the first and second division patterns determined in accordance with a communication speed between the detachable recording medium, and in accordance with a time required to authenticate identification codes to effect the storing of the data;
wherein the first division pattern corresponding to an initial predetermined period of time corresponding to the data to be stored, and having a plurality of sequential time slices, wherein an amount of data to be stored from a first time slice to a last time slice decreases in a step-like manner;
wherein the second division pattern corresponding to data to be stored after the initial predetermined period of time, and having a plurality of sequential time slices, wherein an amount of data to be stored is stored at a constant rate;
subsequently reading the partial piece of audio or video data from the detachable recording medium, while obtaining lacking audio or video data extracted from corresponding complete audio or video data stored in a database accessible via a server to reproduce the complete audio or video data; and
reproducing a complete piece of audio or video using the lacking audio or video data extracted from the database in conjunction with the partial piece of audio or video data stored in the detachable recording medium.

17. The audio/video reproducing method according to claim 16, wherein the recording medium stores the first block of the partial piece of the audio or video data without missing any audio or video data.

18. The audio/video reproducing method according to claim 16, wherein the partial piece of the audio or video data is data in a file area, the data being separated into the file area and a streaming area based on a division pattern.

19. An audio/video reproducing device having a recording medium that stores a pre-loaded partial piece of audio or video data, the recording medium being subsequently loaded in the audio/video reproducing device, and including a communication device, for obtaining lacking data from a remote database accessible via the communication device required to complete the partial piece of audio or video data stored on the recording medium wherein a size of each partial piece of audio or video data stored on the recording medium is determined based on a first and a second division pattern, the first and second division patterns determined in accordance with a communication speed between the recording medium and the remote database, and in accordance with a time required to authenticate identification codes to effect the storing of the data;

the first division pattern corresponding to an predetermined period of time corresponding to the data to be stored, and having a plurality of sequential time slices, wherein an amount of data stored from a first time slice to a last time slice decreases in a step-like manner; and the second division pattern corresponding to data to be stored after the initial predetermined period of time, and having a plurality of sequential time slices, wherein an amount of data is stored is stored at a constant rate.

20. The audio/video reproducing device according to claim 19, wherein the first block of the partial piece of the audio or video data is recorded in the recording medium without missing any audio or video data.

* * * * *